Feb. 13, 1940.  H. L. HARTZELL  2,189,899
METHOD AND APPARATUS FOR OVERCOMING PITTING OF IGNITION TIMER CONTACTS
Filed May 29, 1939  6 Sheets-Sheet 1

INVENTOR
Herman L. Hartzell
BY
Spencer Hardman & Fehr
his ATTORNEYs

Feb. 13, 1940.  H. L. HARTZELL  2,189,899
METHOD AND APPARATUS FOR OVERCOMING PITTING OF IGNITION TIMER CONTACTS
Filed May 29, 1939  6 Sheets-Sheet 2

INVENTOR
Herman L. Hartzell
BY Spencer Hardman & Fehr
his ATTORNEYs

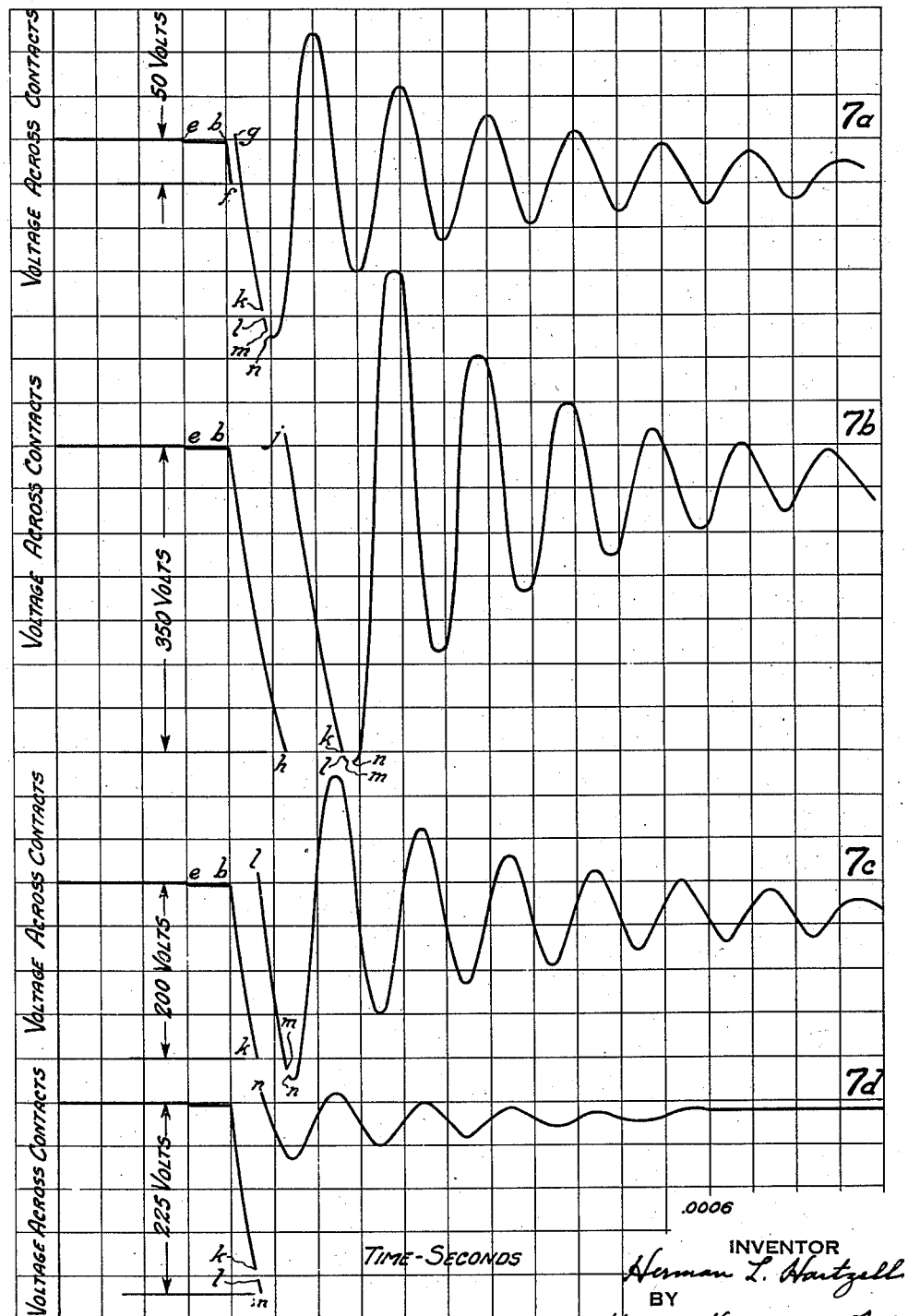

Feb. 13, 1940.   H. L. HARTZELL   2,189,899
METHOD AND APPARATUS FOR OVERCOMING PITTING OF IGNITION TIMER CONTACTS
Filed May 29, 1939   6 Sheets-Sheet 5

INVENTOR
Herman L. Hartzell
BY
Spencer Hardman + Fehr
his ATTORNEYs

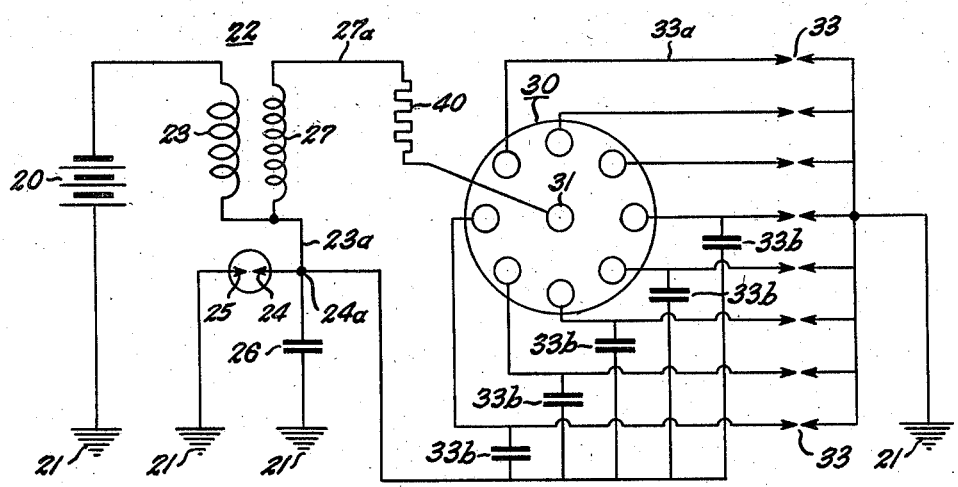
Fig. 12.
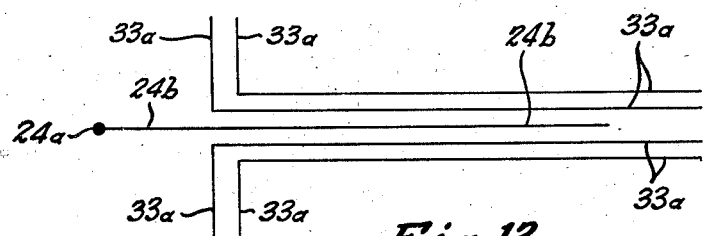
Fig. 13.
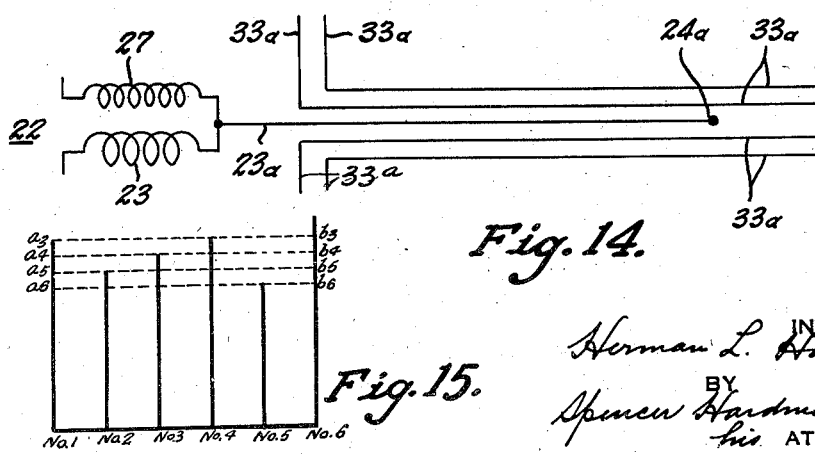
Fig. 14.
Fig. 15.

Patented Feb. 13, 1940

2,189,899

UNITED STATES PATENT OFFICE 2,189,899

METHOD AND APPARATUS FOR OVERCOMING PITTING OF IGNITION TIMER CONTACTS

Herman L. Hartzell, Anderson, Ind., assignor to General Motors Corporation, Detroit, Mich., a corporation of Delaware Application May 29, 1939, Serial No. 276,396

20 Claims. (Cl. 123—148)

This invention relates to ignition apparatus for automobiles and has for its chief aim and object improvement of the efficiency and durability of the ignition system and particularly to increase the life of the contact points of the ignition primary circuit interrupter or timer.

A common cause of rapid deterioration of tungsten contacts when used in ignition distributors is pitting, due to metal transfer from one contact to the other. Attempts have been made to compensate for the pitting of one contact and the building up or coneing on the other contact by the use of a polarity reversing switch by which the polarity of the contacts will be reversed each time the ignition is turned on. Obviously such a method of compensation is very inefficient, if effective at all, because it is not at all likely that the pit left in one of the contacts due to the transfer of metal to the other contact will be filled up again with metal when the contact polarity is reversed.

I propose to deal with the matter of the elimination of contact pitting without reversing the direction current flow from the source to the ignition timer contacts. I have observed that, in some types of automotive ignition systems, there is a tendency to transfer metal to the negative contact, and in others, to the positive contact. In the systems which I have studied, no polarity reversing devices were used. Tendency to build up metal on the negative contact was found to occur in certain installations on automobiles using 6-volt ignition coils. Tendency to build up metal on the positive contact was found to occur in certain installations on busses and trucks using 12-volt ignition coils.

I have discovered that, during the operation of an automotive ignition system, certain phenomena are present, known as transients, which are of two kinds, one kind of transient causing a transfer of contact metal from the positive to the negative and the other kind of transient causing a transfer of metal from the negative to the positive contact. The transient which causes transfer to the negative contact occurs each time the contacts separate and is out of control of those who design or install the ignition system. The transient which causes transfer to the positive contact will occur depending on circumstances which are within the control of those who design and those who install the ignition system. By properly designing and installing the ignition system, I am able to cause those transients which effect transfer to the positive contact to counteract the effect of the other transients which cause transfer to the negative contact.

The nature of the transients which I have succeeded in placing in opposition to one another to serve a useful purpose will be apparent from the following description of certain charts of oscillographs which I have obtained by the use of a high-speed cathode ray oscillograph, and with the aid of amplifying apparatus I have succeeded in obtaining a graphic record of very minute phenomena which hitherto have remained undiscovered.

Figs. 3 to 11 inclusive are charts or diagrams illustrating various phenomena present in an ignition system.

Fig. 12 shows an ignition system constructed to operate in a manner so that the transients which cause transfer of metal from the positive to the negative timer contact will be opposed by a sufficient number of those transients which cause transfer of metal from the negative to the positive contact so that transfer to the negative will be compensated by transfer to the positive.

Figs. 13 and 14 are diagrams showing practical methods of capacity coupling spark plug leads with the ignition timer terminal.

Fig. 15 is a diagram showing variations in spark plug voltages at any given speed, and how I take advantage of this variation in obtaining the number of transients producing transfer to the positive contact required to compensate for transfer to the negative contact.

Figure 1:
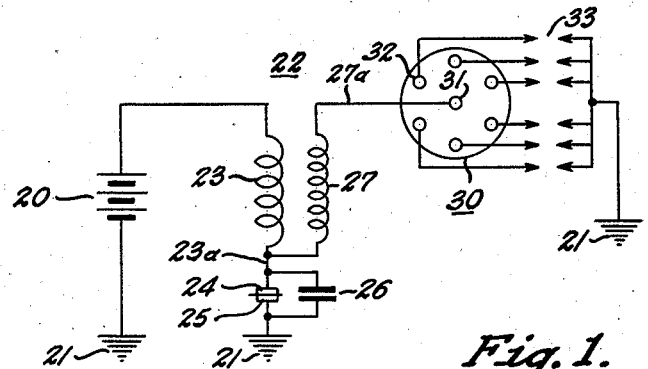
Fig. 1 is a diagram of a conventional direct-current ignition system such as used on automotive vehicles.

The conventional ignition wiring diagram is shown in Fig. 1. There is a battery 20 or other source of direct current grounded at 21 and connected with the primary winding 23 of the conventional ignition coil 22. Primary 23 is connected by primary lead 23a with the ignition timer contacts 24 and 25, the latter being grounded. The contacts are shunted by a condenser 26 which reduces sparking at the contacts. The ignition coil secondary 27 is grounded through the ignition timer contacts 24 and 25 and is connected by lead 27a with the center terminal 31 of the ignition distributor 30 by which sparking impulses are distributed to a number of posts 32 connected by wires with the engine spark plugs 33 which are grounded through the engine cylinders and frame.

Figure 2:
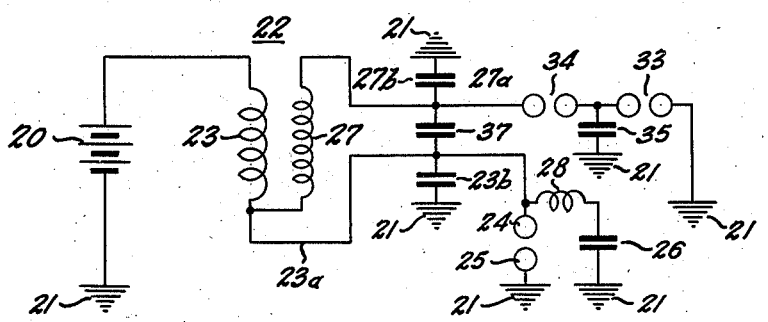
Fig. 2 is a diagram similar to Fig. 1, but is redrawn to show the timer contacts as a spark gap and all of the other electrical parts of the system whether or not they exist as separate physical units.

Since this specification deals almost entirely with phenoma occurring just after the contact points have opened, and since the frequencies at which these phenomena occur are rather high, it is desirable to illustrate the ignition circuit according to Fig. 2. Here the contacts 24 and 25 are shown as a spark gap, the circuit of the condenser 26 has an appreciable inductance designated 28, and the secondary circuit includes two connected spark gaps with capacities to ground. One of these spark gaps is provided by a spark plug 33. The other spark gap 34 is between the conducting arm of the distributor rotor and any one of the distributor posts. The capacities to ground are indicated at 35 and 27b. Condenser 31 represents capacity coupling between coil leads 23a and 27a. Condenser 23b represents capacity coupling between lead 23a and ground.

Figure 3:
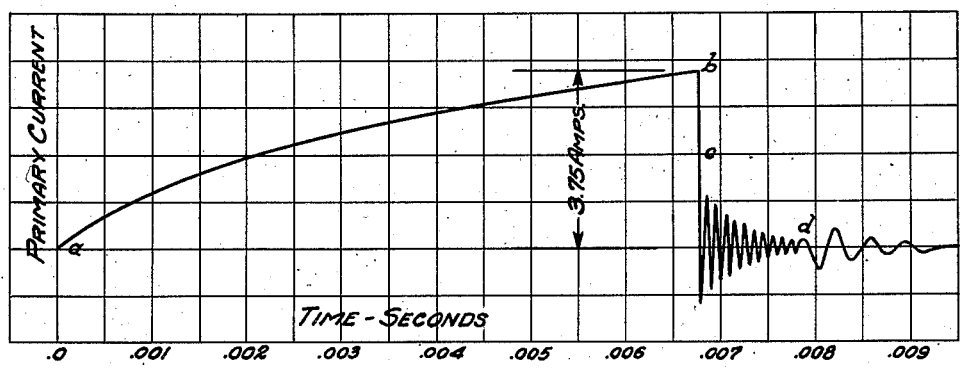

I shall preface my explanation of the phenomena which I have discovered with a brief statement of the well known phenomena of an ignition circuit. Fig. 3 shows graphically the current in the ignition primary circuit during one cycle of operation. This curve has been stretched out to show the details in their proper time relation. The contacts close at $a$. The current increases at a variable rate according to a definite relation of the values of voltage, resistance and inductance. The contacts open at $b$ and the current decreases at a rate dependent mainly on the inductance and capacity of the system. At $c$ the secondary voltage has reached a value sufficient to produce a spark across the plug. The rate of the current change or oscillation again changes because the inductance and capacity of the secondary system has been changed. At $d$ the secondary voltage is too low to maintain the spark so that the constants of the circuit are the same as they were from $b$ to $c$. The oscillation dies out as the remaining energy is dissipated in the losses of the coil circuit.

Figure 4:
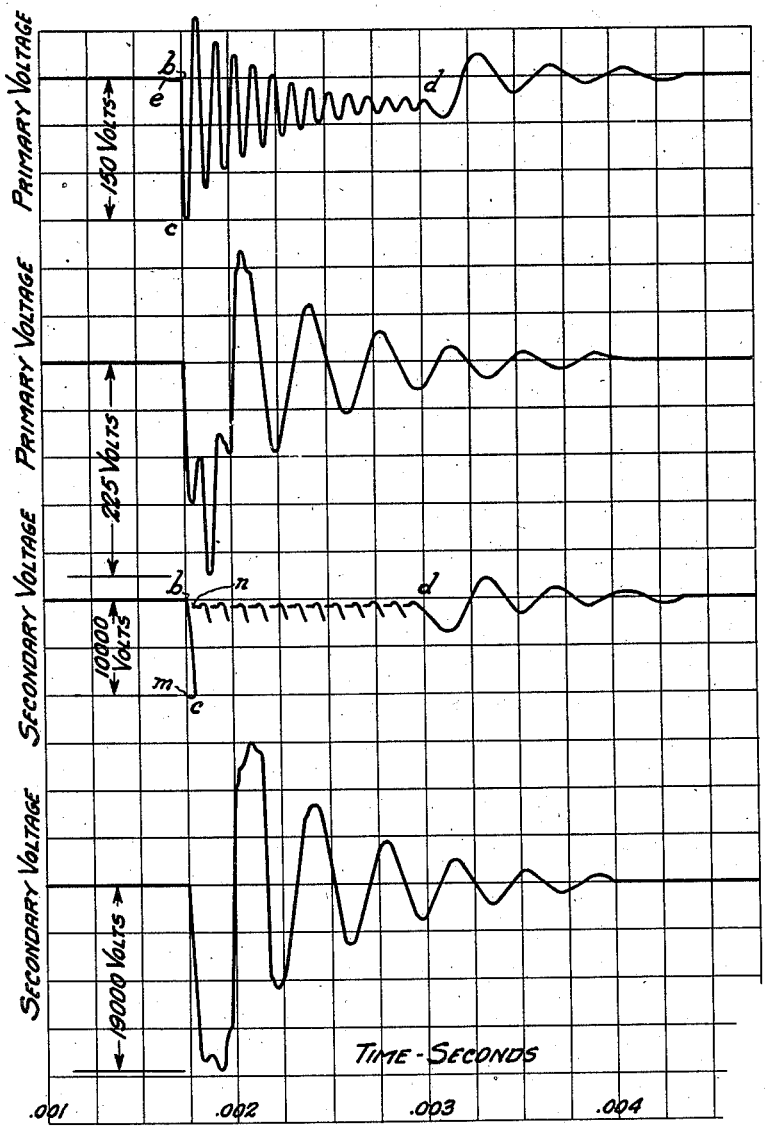

Curve 4a of Fig. 4 shows the voltage induced in the primary winding when the contact points are separated. This voltage added to the battery voltage is applied across the condenser and contacts. It starts to build up at $b$. At $c$ the secondary discharges; so, accordingly, the frequency of the primary voltage oscillation changes. At $d$ when the secondary discharge ceases, the frequency changes to the lower value.

Curve 4b of Fig. 4 shows the primary voltage when the secondary does not fire. This curve shows that there is superimposed on the fundamental frequency a harmonic which is very pronounced on the first half oscillation, but which very rapidly damps out. The effect of this harmonic will be more fully discussed later.

Curve 4c of Fig. 4 shows the voltage across the secondary when it discharges. The voltage builds up at $b$ when the contact points open. At $c$, the discharge occurs and the voltage very rapidly decreases to the comparatively small value required to maintain the discharge across the plug. When the discharge ceases at $d$, the voltage increases slightly and oscillates at the same frequency at the primary until damped out.

Curve 4d of Fig. 4 shows the secondary voltage when there is no discharge. It will be noticed that there is also a harmonic on this voltage wave, that it has the same frequency, that it is less pronounced, and that it is opposite in phase from that harmonic on the primary wave, that is, it is at its lowest value when the primary is at its highest value. The time axis for curves 4a, 4b, 4c and 4d of Fig. 4 has twice the speed of Fig. 1. The same letters on each curve correspond to the same time instant.

These curves are drawn as they would appear on a low speed cathode ray oscilloscope to an uninitiated observer. If these curves were always as shown here, there would be no pitting or burning. Unfortunately that is not the case. Closer observation and higher speed oscilloscopes show other transients which distort these shapes. The type of transient present determines whether there will be a tendency to oxidize, to transfer to the positive contact or to transfer to the negative contact. I shall discuss first the case of transfer to the negative contact.

DISCUSSION OF THE TRANSIENT PRODUCING TRANSFER TO THE NEGATIVE CONTACT

Figure 6:
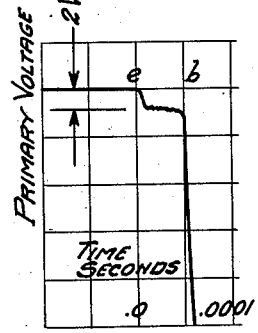
Figure 5:
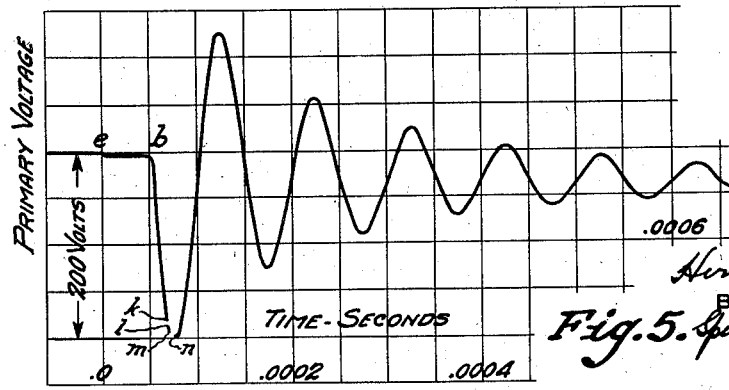

If one looks more closely at the trace on the oscilloscope of the primary voltage, one will notice that the horizontal line just to the left of point $b$ in curve 4a of Fig. 4 actually has a slight offset as shown at $e$ in Fig. 5. The cam strikes the rubbing block at $e$, but the current is not interrupted until at $b$ which is shown here as .00005 second later. This time, however, varies greatly, depending mainly on the rate at which the contacts separate. If an amplifier is used the transient appears as shown in Fig. 6. Here the voltage across the points is shown to be 2 volts until the current is actually interrupted at $b$. I have found that this shape does not change appreciably when the current broken covers the range of values used in ignition systems and that it does not change for an inductance of a few microhenries to 15 millihenries. The shape of the current trace does change with change of inductance. For values of circuit inductance as used in ignition coils there is an almost imperceptible change in the current during this period; but, as the inductance is decreased below .5 millihenry, the change in current becomes more pronounced. This change in current establishes the fact that the voltage across the contacts is supplied by that induced in the circuit by the change of current.

One might suppose this voltage drop might be due to increased contact resistance because of decreased pressure and sliding action of the contacts just previous to their actual separation. However, I found if I decreased the current to be interrupted considerably below the values used in the ignition circuit that the duration of the transient decreased and that, with values of one milliampere, the duration was hardly perceptible. This result definitely establishes the fact that the contacts separate at the beginning of the transient as shown at $e$ in Fig. 6.

Curve 4c and Fig. 5 show a gap between $m$ and $n$; and Fig. 5 shows a gap between $k$ and $l$. At these points certain phenomena took place which were of such high frequency that the oscillograph would not record them. These phenomena will be discussed later.

The amount of contact separation which has taken place in .00005 second of time of duration of the transient $e-b$ is of interest. This might be accurately computed from timer cam movement if one knew exactly the extent of the deflections which take place in the circuit breaker lever assembly. But these deflections can not be determined with any degree of accuracy. Ignoring the breaker lever deflection, I calculated the extent of contact separation at the end of transient e—b and found it to be .0003 inch. My calculation was based on assuming a straight line relation between time and contact movement.

DISCUSSION OF THE PHENOMENA OF ELECTRICAL DISCHARGES ACROSS SMALL GAPS

A review of the literature available of the breakdown voltages of small gaps reveals a peculiar characteristic. For air at atmospheric pressure the break-down voltage between parallel electrodes decreases as the distance between the electrodes is decreased until a gap of .004 inch is reached, for which gap the break-down voltage is 340 volts, then the breakdown voltage rapidly increases with further decrease in gap length until the length is .002 inch, and then further decreases in gap length very rapidly decreases the breakdown voltage. If one spherical electrode is used in conjunction with a flat electrode the curve will not show the increase above the 340 volt value with decreasing gap, since the spherical shape allows the discharge to take place between those adjacent surfaces which are at the distance apart which corresponds to the 340 volt breakdown spacing, but when the gap is decreased beyond .0002 inch the breakdown voltage again decreases.

The following explanation of these peculiarities has been given by various physicists, such as Von R. Holm (Die Elektronzerstaubung in Abhebekontakten, Zeitschrift für Techrischer Physik, 1934, p. 483) and J. J. Thomson (Conduction of Electricity through Gases, p. 455, Cambridge University Press, 1906):

For gaps greater than .004 inch free electrons in the gap are accelerated toward the positive electrode by the potential difference between the electrodes. When the potential difference is great enough to increase the velocity to that required by the electrons to produce new free electrons by collision with the gas molecules the number of free electrons is progressively increased. The positive ions formed from the gas molecules by these collisions are accelerated toward the negative electrode and they in turn produce more free electrons and positive ions by collision with the gas molecules and with the electrode. Further increases in the voltage will produce a sufficient quantity of positive ions and electrons to provide a continuous conducting path and a luminous discharge takes place. In this discharge most of the energy is carried by the positive ions. Now as the gap is decreased below a spacing of .004 inch more and more of the electrons reach the positive electrode without producing any positive ions, so that it is necessary to increase the accelerating voltage to enable those remaining in the gap to gain velocities necessary to sufficiently ionize the gas to form the conducting path. This voltage increases with decreased gap until the potential gradient is sufficient to pull electrons from the electrodes themselves; and, since the number of gas molecules in this very short gap is small, there is very little interference to the movement of the electrons toward the positive electrodes. Consequently, the large electron flow results in a spark in which the energy is carried almost entirely by electrons moving from the negative to the positive electrode.

It is seen then that the discharges can be divided into two kinds: (1) those occurring in gaps longer than .0002 inch in which most of the energy is carried by positive ions bombarding the negative electrode; and (2) those occurring in gaps smaller than .0002 inch in which most of the energy is carried by electrons bombarding the positive electrode. One has here the key to the conditions prevailing when there is transfer to the negative contact and when there is transfer to the positive contact because the electrode being bombarded is heated in a very small area to the vaporization point and this metallic vapor will condense on the nearest cool surface, which in this case is the opposite electrode. So one can expect transfer to the negative contact when there is a discharge through a gap which is less than .0002 inch and transfer to the positive when there is a discharge through a gap greater than .0002 inch. The value of .0002 inch is that given for air at atmospheric pressure. For lower pressures this distance is increased; and, since the pressure in the space between the contact points is less than atmospheric, the value of .0003 inch I have found as a demarcation distance corresponds very closely to the findings of other investigators.

Figure 11:
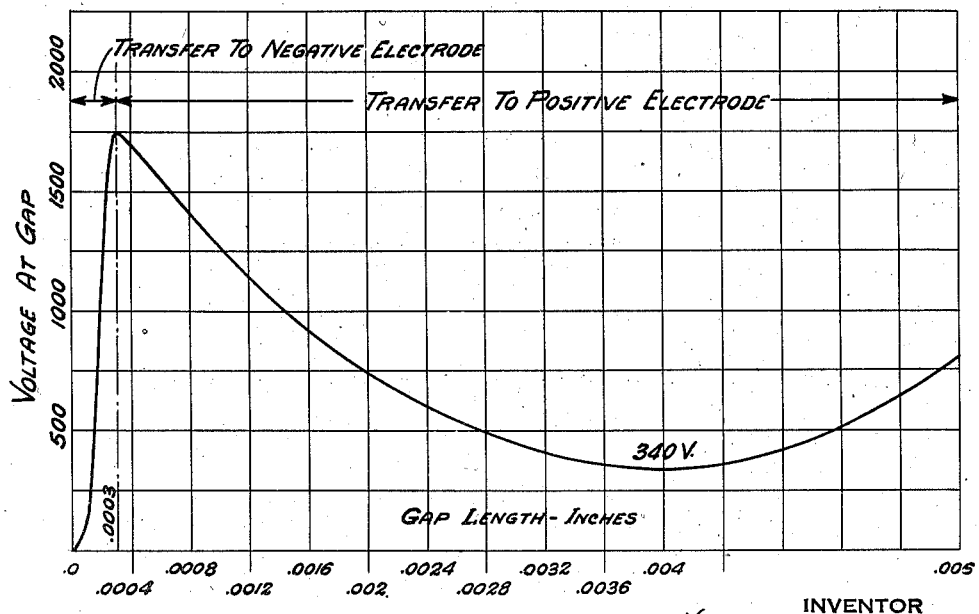

Fig. 11 shows the voltages at various gap lengths. From above .004" down to .004" gap length the voltage decreases to about 340 volts. From .004" down to .0003" the voltage increases to 1750 volts. From .0003" down to zero the voltage decreases to zero.

For gaps shorter than .0003" (.0002" at atmospheric pressure) electrons form the conducting path. Energy is carried by electrons bombarding the positive electrode which becomes hot. Metal of the positive electrode vaporizes and travels toward the negative where it condenses, the negative electrode being cooler than the positive electrode. Hence there is a transfer of metal to the negative electrode. The transient in an ignition system which produces this transfer will be called the "negative-transfer" transient.

For gaps greater than .0003" (.0002" atmospheric pressure) ions form the conducting path. Free electrons in the gap are accelerated toward the positive electrode by the potential difference between the electrodes. The electrons collide to form ions which are accelerated toward the negative electrode. Energy is carried by positive ions bombarding the negative electrode which becomes hot causing metal thereof to vaporize and to condense on the positive electrode which is cooler. Hence there is a transfer of metal to the positive electrode. The arc in an ignition system which produces this transfer will be called the "positive-transfer" arc.

TRANSFER TO THE NEGATIVE CONTACT OCCURS AT EVERY BREAK

Since the negative-transfer transient e—b shown in Figs. 5 and 6 occurs at every break, we should expect, if no further transients occurred later, that there would be a transfer of metal to the negative contact; and that is exactly the case. Whenever I find a condition where the primary voltage wave is as shown in Fig. 5 I always find severe transfer to the negative contact. There is the possibility of speeding up the rate of contact separation so that the duration of the transient will be so short that the transfer of metal obtained will be of no consequence; but this, I am sure, is a physical impossibility with a mechanical system which must operate as often as is required of an ignition circuit breaker.

Transfer to Negative is Balanced by Transfer to Positive

The only way then to obtain flat contact operation is to balance the metal transferred during the negative-transfer transient e—b by that transferred in the opposite direction during the positive-transfer arc which occurs after the gap is greater than .0003". Of course, if these positive-transfer arcs are too numerous or too severe, more than enough material to balance transfer to negative will be transferred, with a resulting build-up on the positive contact.

Various Conditions Determine the Number and Severity of the Positive-Transfer Arcs I shall next discuss the various conditions which determine the number and severity of the positive-transfer arcs. If one changes some of the conditions, and again looks at the trace on the oscilloscope of the voltage across the contacts, one may see shapes as shown by curves 7a, 7b, 7c and 7d of Fig. 7.

A Vibration of the Contact Arm Known as Whipping May Cause Positive-Transfer Arcs.

Curve 7a shows that the negative-transfer transient e—b had stopped and that voltage across the contacts had reached a value of 50 volts when suddenly it decreases to zero again, as indicated at f—g, after which it again rises to a value at which the secondary discharges and then takes the shape shown in curve 4a of Fig. 4. The break in the rise is caused by a discharge across the points which drains the energy from the condenser, reducing its voltage to zero. Since this discharge f—g occurs at less than 340 volts it must occur in the region under .003" contact separation; but, since the negative-transfer transient e—b lasted until that separation, the contacts must have approached each other again because of the contact arm vibration. I know that contact arm vibration is responsible since the frequency of the occurrence of this transient corresponds to vibration periods of the arm and I also know that the contacts do not touch because the number of these transients decreases with increased condenser capacity. Since this voltage is high enough to support an arc if a spark is once started, there is positive ion conduction, and high speed oscillograph pictures show the same circuit conditions as prevail when an arc occurs at a higher potential than 340 volts; and, since endurance tests show that this type of transient tends to correct transfer to the negative, I am sure that most of the conduction is by positive ions. The number and voltage at which the positive-transfer transients f—g occur can be decreased by a stiffer breaker arm as well as by increasing condenser capacity.

A Positive-Transfer Arc Will Occur When the Induced Primary Voltage Exceeds 340 Volts Before the Secondary Discharges Curve 7b of Fig. 7 shows the shape of the voltage across the contacts under this condition. The gap h—j in the curve indicates discharge of the primary across the contacts. By the time the voltage has built up again the contacts have separated farther; and, even though the voltage may be higher than the first value, it will not be high enough to start another arc. In this arc h—j the energy is carried by positive ions and consequently it transfers material to the positive contact. The constants of the usual condenser and point circuit are such that the maximum current in the arc is approximately the same numerically in amperes as the breakdown voltage was in volts. In this case the maximum current would be about 340 amperes. The usual frequency of this discharge h—j is one million cycles; but, since the oscillation is very rapidly damped out, the current is essentially uni-directional. A typical curve of the discharge current is shown by curve 8d of Fig. 8. This curve shows a peak of 200 amperes and corresponds to the current obtained when the arc occurs when the condenser is charged to that voltage. Because of the high current value obtained during the condition shown by curve 7b of Fig. 7, only a low percentage of this type of discharge is needed to maintain flat contact operation. Fifteen to twenty-five percent is sufficient. If more than this number are obtained the transfer will be to the positive contact. The positive-transfer transient h—j usually occurs only with low ratio coils such as used on 24 and 32 volt systems or when two 6-volt coils are used with the primaries connected in series. Faster rates of contact separation, larger capacity condensers and high ratio coils are recommended for correction for too much transfer to the positive when caused by positive-transfer transient h—j.

Positive-Transfer Arcs Occurring During Secondary Discharge

The positive-transfer arcs m—n occurring when the secondary discharges shown by curves 7c and 7d of Fig. 7 are more common and are the ones which can be more safely used to balance conditions for maintaining flat contact operation, particularly because the number of arcs occurring during a given period of vehicle operation can be reduced automatically as the engine speed increases or as engine cylinder compression decreases in order to prevent overbalancing transfer to the negative contact. One exceptional case is when a low ratio coil is used with wide plug gaps on an engine that operates an abnormal length of time at low speeds. Twelve volt coils are usually lower ratio coils than the 6-volt types, consequently the condenser voltage is much higher with the 12-volt coils at the time these positive-transfer transients occur. It is possible to obtain a sufficient number of discharges to cause a resultant transfer to the positive even though the engine is operated at average speeds. Too many of these positive-transfer transients can also occur with 24 and 32 volt coils and with two 6-volt coils operated in series.

Figure 8:
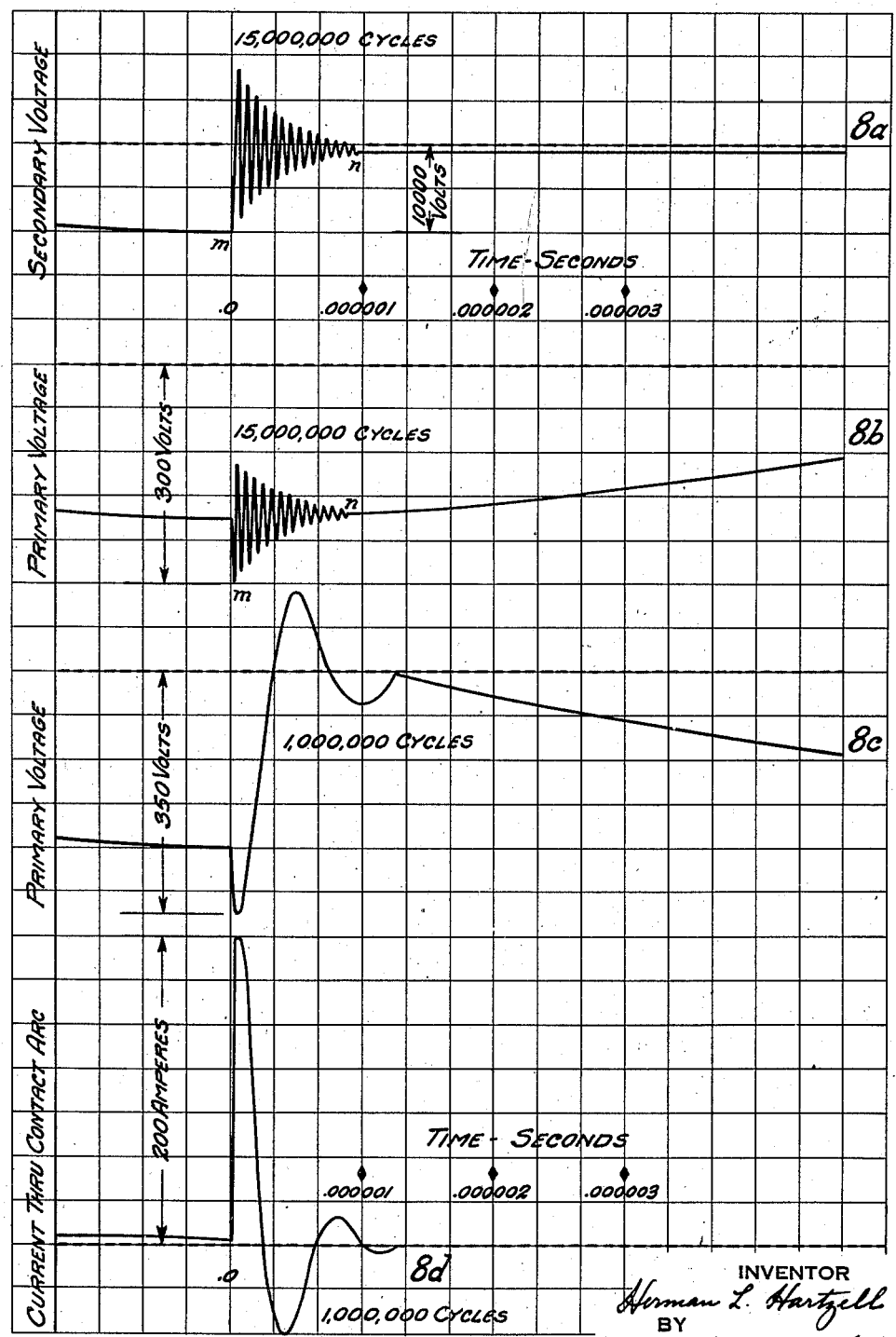

Since it is the positive-transfer arcs occurring when the secondary discharges when I prefer to use to obtain satisfactory contact life, a more detailed discussion of them is in order. One may ask how is it possible to establish the arc at an induced primary voltage under 340 volts when it is obvious that the contacts are opened more than .0003 inch at the time it occurs? Curves 8a, 8b, 8c and 8d of Fig. 8 show what happens. These curves are drawn with a time axis 150 times faster than the curves of Fig. 7 were drawn in order to show oscillations at 15,000,000.

Curve 8a shows the section of the secondary voltage curve shown by curve 4c from m to n. The high speed oscillograph shows, in the place of the discontinuity, a very high frequency oscillation. This oscillation represents a very high rate of energy dissipation and it is the disturbance which causes radio interference. This high frequency oscillation is transferred to the primary circuit by capacity coupling and shows up as a transient voltage superimposed on the induced primary voltage as shown by curve 8b. This combined voltage is also applied across the contacts. Curve 8b shows the case where the combined voltage was not enough to start an arc across the contacts. In this case the superimposed oscillations of the transient are dampened out and the induced primary voltage continues on the pattern shown in Fig. 5. Curve 8b shows that section of Fig. 5 from m to n or k to l as will be explained later. The discontinuity in Fig. 5 between these points is caused by the slow speed oscilloscope being unable to record the superimposed high frequency oscillation.

Curve 8c shows the case where the transient voltage derived from the high frequency oscillation plus the induced primary voltage was sufficient to start the arc. In this case the voltage oscillates until the condenser is discharged, and then the arc stops and the voltage starts to build up again. Curve 8d shows the shape and value of the current discharge through the arc.

Referring to curves 7c and 7d of Fig. 7, I wish to point out that curve 7c shows the wave shape when the transient voltage derived from the high frequency oscillation occurring at the time the rotor gap fired, as indicated by the gap k—l in curve 7c, was sufficient to cause an arc across the contacts. In this case the spark plug will not fire, as indicated by gap m—n, until the voltage again builds up. Curve 7d shows the condition where the transient occurring at the time the rotor gap fired, as indicated by gap k—l in curve 7d, was not sufficient to cause the arc, but that one occurring at the time the plug gap fired was sufficient, as indicated by gap m—n of curve 7d. In the latter case the primary voltage does not again build up appreciably because energy was lost from the system both at the primary contacts and the spark plug. Regardless of whether the discharge of the primary across the contacts occurs at k—l or at m—n, the nature of this positive-transfer arc is the same.

FACTORS CONTROLLING POSITIVE-TRANSFER ARCS OCCURRING DURING SECONDARY DISCHARGE

The problem of maintaining flat contact operation involves the consideration of three factors which determine the number of times the condenser discharges through an arc between the contacts. These three factors are (1) voltage required to start an arc, which depends on the gap between the contacts at the time the secondary discharges, (2) the voltage across the contacts which is supplied by the induced primary voltage at the time the secondary discharges, and (3) the transient voltage derived from the high-frequency oscillation which is added to the primary induced voltage at the time the secondary discharges. All changes which vary any of these factors have an influence on the point operation. It should be borne in mind that, if there is transfer to the positive contact, there are too many arcs; and, if there is transfer to the negative contact, there are too few arcs. I wish to point out the changes which one can make to vary each of these three factors.

FACTOR No. 1

*Control of positive-transfer arcs by control of contact gap at the time the secondary discharges*

Referring to factor (1) of the preceding paragraph, the gap distance between the contacts in which we are interested is the distance at the time the rotor or plug gap fires, except in the case where the induced primary voltage alone is sufficient to start an arc. (Refer to curve 7b.)

*Control of gap distance at time of secondary discharge by control of rate of opening of the contacts*

The distance can be varied by circuit breaker cam changes. A faster rate of opening will increase the distance.

*Control of gap distance at time of secondary discharge by varying the time of build-up of secondary voltage*

For a given rate of opening the distance can be varied by changing the time interval between the separation and the firing. This change can be made in a number of ways.

*Effect of varying the timer-condenser capacity on the rate of secondary voltage build-up*

Increased condenser capacity will slow down the rate of voltage build-up and thus increase the time required to reach a given secondary voltage.

*Effect of changing the supply voltage on the rate of secondary voltage build-up*

Figure 9:
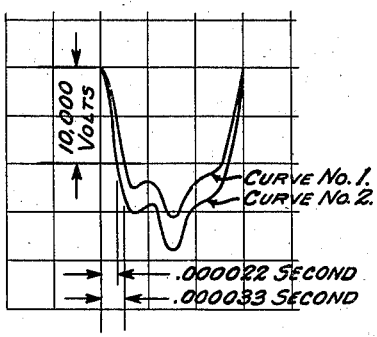

A lower supply voltage will increase the time. Fig. 9 shows the reason for this effect. Curve No. 1 shows one-half cycle of the secondary voltage when the supply voltage is low, and curve No. 2 shows the voltage when the supply voltage is normal. If 10,000 volts are required to fire the plug in each case, it is obvious that there is an appreciably longer time interval with the low voltage curve. This condition illustrates why transfer to the negative can be corrected by changing to a generator which keeps the battery fully charged. The effect of the lower supply voltage is to decrease the break amperes; and all items which decrease the break amperes will have the same influence. Extra resistance in the primary circuit, hot coils, because of heat received from the engine or poor ventilation, and short contact angle will all tend to increase transfer to the negative.

*Effect of changing secondary lead capacity on rate of secondary voltage build-up*

Increased secondary lead capacity has about the same effect as low break amperes. The voltage which the coil can develop depends on the connected capacity. High capacity will flatten the voltage curve and thus require a longer time to reach the necessary voltage. Change in the capacity of the secondary or high tension winding would also produce a similar effect.

FACTOR No. 2

*Effects of varying primary induced voltage by changing the timer-condenser capacity*

Primary induced voltage may be reduced by increasing the capacity of the timer condenser 28. A change of condenser capacity affects the primary voltage faster than it does the secondary voltage so that the primary voltage for a given secondary voltage can be varied by a condenser change alone. The range through which the condenser capacity can be varied is limited on the high end by the secondary voltage required and on the low end by oxidation of the contacts. I recommend .6 mfd as the high limit for 12 volt systems and .4 mfd for 6-volt systems. I recommend .18 mfd as the low limit for ordinary city driving service on both 6 and 12 volt systems and .15 mfd for cars, trucks or coaches doing strictly cross-country work.

Changing the transformation ratio

An effective way of increasing induced primary voltage is by reducing the ratio of primary to secondary turns of the ignition coil; but this method is not available in most of the cases where the transfer is to the negative contact because to increase the transfer to positive and thus decrease the tendency to transfer to the negative would mean using a lower ratio coil, which is not desirable from a voltage standpoint. The reason high ratio coils are used is to insure adequate secondary voltage throughout the speed range. A low ratio coil used with a timer providing longer contact closing or used with higher applied voltage may supply the top speed performance; but, at low speeds with a cold engine, the primary voltage may establish an arc before the secondary has fired and this loss of energy will prevent the secondary voltage reaching the value necessary to fire the plug. I have not encountered any cases where it seemed desirable to correct transfer to the negative by a coil ratio change. However, this method is very good for the correction of transfer to the positive.

Figure 10:
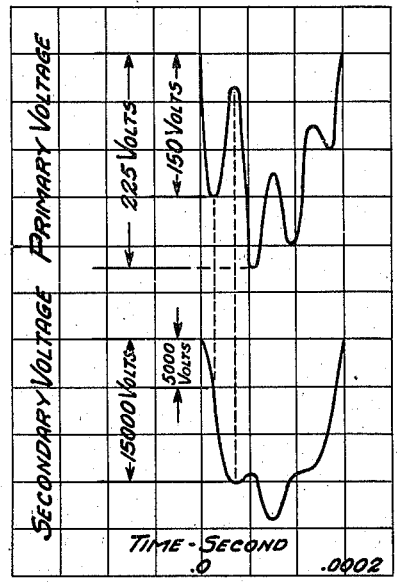

Fig. 10 shows one-half cycle of the open circuit primary voltage and open circuit secondary voltage of a certain coil having high transformation ratio. It will be noticed that the harmonic on the primary is very pronounced. If the secondary voltage required is between 5,000 and 15,000 volts the primary voltage will have passed its first peak and will have a rather low value. This curve demonstrates why a high ratio coil causes transfer to the negative on engines which require high secondary voltage.

FACTOR No. 3

*Control of the transient voltage derived from high frequency oscillation which is added to the primary induced voltage at the time the secondary discharges*

Compensation for contact metal transfer may depend on the balance of Factor No. 1, distance between contacts at the time of secondary discharge, or time, and Factor No. 2, induced primary voltage; and this balance is different for every type of installation. When the necessary correction cannot be obtained by the balance of Factors No. 1 and No. 2, then it is necessary to work with the high frequency oscillation which is the third factor herein referred to. I have tested four ways of controlling the effect of the high frequency oscillation. Reference to Fig. 2 will show two of these ways.

*Effect of varying capacity coupling between coil-to-distributor primary and secondary leads, and between these leads and ground*

One way shown by Fig. 2 is to change the capacity 37 between the low tension and high tension coil-to-distributor leads 23a and 27a and also change their capacities 23b and 27b to ground. Increasing the capacity 37 between the leads increases the value of the transient voltage superimposed on the primary voltage. Decreasing the capacity of the leads to ground increases the value of the transient voltage. Consequently on one installation I corrected the transfer to the positive contact by separating the two leads 23a and 27a and, on another, I corrected the transfer to the negative by taping the two leads together and holding them away from the engine.

*Effect of varying the effect of the high frequency by-pass ability of condenser 26 on transient voltage derived from high frequency oscillation*

The other method shown in Fig. 2 is that control obtained by changing the high freqeuncy bypass ability of the condenser 26 across the points. At 15,000,000 cycles the condenser lead has appreciable inductance and its length is a more important factor than the capacity itself, when the capacity is kept between the limits specified heretofore. In general, the transient voltage is increased by decreasing the high frequency bypass ability of the condenser 26 which is accomplished by increasing the length of the condenser lead 28. In the case of transfer to the positive on the installation with two coils in series, I was not able to correct the condition by the increase of condenser capacity before mentioned, but I had to decrease the condenser lead to the minimum possible in order to increase the by-passing ability of the condenser and reduce the transient voltage and thus obtain fewer positive-transfer arcs. In a case of tendency to transfer to the negative, and where the by-passing ability of a certain condenser is high, it may be necessary to increase the condenser lead length to obtain the desired correction, altho one increases the capacity coupling between the primary and secondary coil-to-distributor-leads 23a and 27a. In a few cases, I have corrected transfer to the negative by using a long lead condenser on the outside of the ignition distributor housing.

*Effect of use of a resistor or choke in the secondary wiring on transient voltage derived from the high frequency oscillation*

One way to reduce the voltage of the transient derived from high frequency oscillation is by the use of a radio interference suppressor either at the plugs or at the center terminal of the cap. Fig. 12 shows an interference suppressor 40 between the coil secondary 27 and the center terminal of the cap. In fact, it is this transient which causes radio interference. Hence radio interference suppressors are used to eliminate it if possible. In the case of transfer to the positive, the radio suppressor helps one; but it is the upsetting factor in cases of transfer to the negative on radio equipped cars. If it were not for the low voltage discharge (50-volts shown in curve 7a of Fig. 7), radio equipped cars would have a very bad reputation for transfer to the negative. In other words, the radio interference suppressor reduces the effect of the arc initiating transient m—n referred to and indicated by curves 8a and 8b.

*Effect of capacity couplings between the insulated timer terminal and certain spark plug cables on transient voltage derived from the high frequency oscillation*

The fourth method can be used to correct transfer to the negative on radio equipped cars. I couple one or more of the spark plug leads 33a by a condenser 33b with the insulated terminal to which the timer contact 24 is connected. The number of condenser couplings required depends upon the required amount of correction to counteract transfer to the negative. The leads from the condenser 33b to the timer terminal 24a should be as short as possible. One practical method of providing capacity couplings between the spark plug leads 33a and the timer terminal 24a is shown in Figure 13. The required number of leads 33a are bundled together with a lead 24b running down through the center of the bundle so that the spacing between lead 24b and each of the leads 33a are substantially the same. Another method of obtaining capacity coupling is shown in Figure 14. A number of spark plug leads 33a are brought alongside the wire 23a which connects the ignition coil 22 with the timer terminal 24a. The leads 33a and the single wire 23a are bundled together with the wire 23a in the center.

Where no more than half the total number of spark plug leads are required to be capacity-coupled with the timer terminal, the arrangement shown in Figures 13 and 14 will be satisfactory as it is not likely that the engine will cross-fire. If conditions are such that more than half the total number of spark plug leads are required to be capacity-coupled to the timer terminal it is necessary to provide capacity coupling between the spark plug leads and ground. It is satisfactory if this capacity coupling is three to four times the capacity between the leads.

SUMMARY OF FACTORS NO. 1, NO. 2 AND NO. 3

In the foregoing discussion of these factors and in the summary which follows, no account is taken of variation in engine speed, and load and resulting differences in spark plug voltages; and no account is taken in differences in voltage at the various spark plugs of the engine, at the same engine speed. These conditions will be discussed later.

FACTOR No. 1

Distance between contacts at the time of secondary discharge.

Increase of distance results in decrease in transfer to the positive contact.

Increase of distance is effected by:
(1) Using a cam which gives faster rate of opening.
(2) Increasing the time interval between contact separation and secondary discharge.
    (a) Increasing capacity of timer-condenser 26.
    (b) Decreasing the break amperes by:
        (i) Lower supply voltage.
        (ii) Extra resistance in primary circuit.
        (iii) Hot coils.
        (iv) Short contact closing period.
    (c) Increasing secondary lead capacity.

FACTOR No. 2

Voltage across the contacts which is supplied by the induced primary voltage.

Increase of induced primary voltage results in increase in transfer to the positive contact.

Increase of voltage is effected by:
(1) Decrease of capacity of the condenser 26 across the contact points.
(2) Decrease of transformation ratio of the ignition coil.

FACTOR No. 3

Control of derivation of voltage from high frequency oscillation which accompanies the discharge of the secondary circuit.

Increase of transfer to the positive is obtained by increasing the transient voltage derived from high frequency oscillation sufficiently that transient voltage plus primary induced voltage will cause positive-transfer arcs, such as k—1 in diagram 7c or m—n in diagram 7d.

Four methods of controlling the transient voltage:
(1) Increasing capacity 37 between coil to-distributor low-tension and high tension leads, and decreasing capacities 27a and 27b between these leads and ground increases the transient voltage.
(2) Decreasing the high frequency by-pass ability of the condenser 26 by increasing length of condenser lead 28 increases transient voltage. To a limited extent, the by-pass ability of the condenser can be decreased by decreasing the capacity. In case of 12-volt system where the tendency is to transfer to the positive, increase of capacity of condenser 26 is a practical remedy because increasing the condenser capacity effects not only a reduction in primary induced voltage, (converse of Factor No. 2 (1)), and increase of time interval between contact separation and secondary discharge, (Factor No. 1—(2)), but also increase of condenser by-pass ability which reduces transient voltage.
(3) The resistor or choke 40 (radio interference suppressor) at plugs or at center terminal of distributor cap decreases transient voltage.
(4) The capacity coupling of one or more spark plug leads with the insulated timer terminal may be used to correct transfer to the negative on cars using radio interference suppressors. The number of the coupling determines the number of timers per engine cycles that the transient voltages are effectively applied to the timer contacts.

*General application to pleasure car service (6 volt ignition) of the principles of balancing contact metal transfer*

In 6 volt ignition apparatus used on pleasure automobiles there is generally under-compensation for transfer to the negative. Hence, there is build-up of metal on the negative contact. The primary induced voltage is generally 100-150 volts. No consideration has heretofore been given to proper location of ignition wires, timer-condenser lead length, etc. The cathode ray oscilloscope shows as in Fig. 5 for every ignition spark, the negative-transfer transient e—b, but no positive-transfer arcs at k—l or m—n. The voltage of the primary induced current plus the transient voltage derived from the high frequency oscillation is too low to start an arc. The transient voltage must be increased so that the total voltage impressed upon the contacts at the time of secondary discharge will be at least approximately 340 volts. The following adjustments made to increase the high frequency oscillation voltage have been found satisfactory, assuming that the other conditions, such as coil transformation ratio, supply voltage and rate of breaker opening are up to par:

To increase transient voltage derived from high frequency oscillation:

Coarse adjustment—decrease capacity 27b, by moving wire 27a further from ground.

Finer adjustment—increase capacity 37 by placing wires 23a and 27a closer together; or decreasing capacity 23b by moving wire 23a further from ground.

Finest adjustment—decrease high frequency by-pass ability of timer-condenser 26 by increasing length (hence, inductance) of condenser lead 28.

*General application to passenger bus and truck service (12 volt ignition) of the principles of contact metal transfer*

In 12 volt ignition apparatus used on trucks and passenger buses, there is generally a tendency to over-compensate for transfer to the negative. Hence, there is build up of metal on the positive contact. The difference between pleasure car and passenger bus service with respect to transfer of metal is generally due to the difference in primary induced voltage. In case of passenger bus service, this voltage is higher, being around 300 volts. The transient voltage derived from the high frequency oscillation would need to be only 50 volts in order to bring the total voltage impressed on the timer contact to around 340 volts required to start a positive-transfer arc at the time the secondary discharges. Fig. 7c or 7d shows what the oscilloscope would generally indicate with respect to a 12-volt truck or bus ignition system when no attention had been paid to arrangement of wires, length of timer-condenser lead, etc. These would be a positive-transfer arc for every ignition spark. Therefore the transient voltage derived from high frequency oscillation must be reduced. This is generally accomplished by the following adjustments:

Coarse adjustment—increase capacity 27b by moving wire 27a closer to ground.

Finer adjustment—decrease capacity 37 by separating wires 23a and 27a; or increase capacity 23b by moving wire 23a closer to ground.

Finest adjustment—increase high-frequency by-pass ability of timer-condenser 26 by decreasing length (hence, inductance) of condenser lead 28.

*Effect of variations in engine operating conditions*

In Fig. 15, the six vertical lines numbered #1 to #6 represent relative voltage at the spark gaps of a six-cylinder engine. The spark gap voltages vary due to variations in the spark gaps of the spark plugs and to variations in cylinder compression. The horizontal broken lines $a_3$—$b_3$, $a_4$—$b_4$, etc. represent different levels of a line $a$—$b$. Line $a$—$b$ represents that adjustment of the capacities 37, 23b and 27a and of the inductance 28 which requires that the spark gap voltage be at a certain level before the total voltage at the contacts at time of secondary discharge can reach the required amount to cause compensating arcs to occur at the primary contacts.

Positions $a_3$—$b_3$, $a_4$—$b_4$, $a_5$—$b_5$, $a_6$—$b_6$, of line $a$—$b$ show, respectively, the levels which will give 3, 4, 5 and 6 positive-transfer arcs $m$—$n$ (Fig. 7d) at some given engine speed. In passenger car service, the problem is generally to lower the level of line $a$—$b$, so as to obtain more positive-transfer arcs $m$—$n$ at a given speed. In bus service, the problem is generally to raise the level of line $a$—$b$, so as to obtain fewer compensating arcs at a given speed.

*As engine speed increases, few positive-transfer arcs are available*

As engine speed increases, the extent of contact separation when the secondary discharges is greater than .004 inch requiring that the total voltage impressed upon contacts be substantially greater than 340 volts before a positive-transfer arc will be started.

As engine speed increases, spark plug voltage decreases due to hotter plugs, and to lower compression pressures in the engine cylinders because less fuel mixture will enter the cylinder at higher speeds. The voltage at the spark plugs may vary from 15,000 volts at low speed to 5000 volts at high speed. The lowering of the spark plug voltages is represented in Fig. 15 by the raising of the level of the line $a$—$b$. As engine speed increases, the level of line $a$—$b$ is finally raised above the level of any spark plug voltage, and no positive-transfer arc $m$—$n$ (Fig. 7d) is obtained.

In case of a six-cylinder pleasure car, for example, a recommended practice is to adjust the capacities 37, 23b, 27b, and inductance 28 so as to provide six positive-transfer arcs $m$—$n$ during each engine cycle for speeds up to 25 M. P. H., a decreasing number between 25 M. P. H. and 45 M. P. H. and no transients above 45 M. P. H. The practical method for pleasure car service is to over-compensate for negative-transfer during the lower speed range and to reduce the compensation as the speed increases so that, during the ordinary use of the vehicle, the metal transferred to the positive contact balances the metal transferred to the negative contact. It is a case of an average amount of positive-transfer balancing an average amount of negative-transfer. The data necessary for the determination of the adjustments of the capacities and inductance is determined by oscilloscope studies made during a test run of an engine of a particular model of car, and by experimenting with those adjustments to determine what conditions of adjustment are best suited to give flat contact operation.

I use the term "pleasure car service" to mean six-volt ignition service used on cars which operate over a wide speed range. Such cars will include all commercial vehicles which use 6 volt ignition and operate over a wide speed range.

In the case of bus and truck service using 12-volt ignition, where the driving range is limited to lower speeds, and the tendency is toward transfer to the positive, advantage can be taken of variations in spark plug voltages due to variations in engine compression pressures which are greater during acceleration, and less during deceleration and idling. The adjustments are such as to make the positive-transfer arcs $m$—$n$ available only during acceleration.

*Effects obtained from using timer-condensers of different capacities*

The amount of corrective positive-transfer obtained from each arc depends on the capacity of the condenser 26 and the voltage to which it is charged at the time the arc occurs.

To some extent adjustment for under-compensation for negative-transfer, or for over-compensation can be effected by changing the capacity of condenser 26. Variations in capacity of condenser 26 are preferred when necessary to avoid extremes of the adjustments of capacities 37, 23b, 27b which might result in freak and impractical arrangements of the ignition wiring.

Varying the capacity of condenser 26 alone may not be feasible. In the case of 6-volt ignition for pleasure car service the capacity of condenser 26 may not be made small enough to effect compensation for negative-transfer because the contacts will oxidize as the result of using a low capacity condenser 26. The recommended capacity is .18 to .23 m. f. In case of bus service (12-volt), the capacity of condenser 26 cannot be made large enough to relieve positive-transfer because a large condenser would cause the secondary voltage to be too low to fire the spark plugs. Condensers 26 above .6 m. f. are not recommended.

As a typical case with a specific coil, for 12 volt service, condensers of the following capacities are recommended for different types of service:

| Average driving speed | Capacity of condenser 26 | Percentage of positive transfer arcs, compared with total contact operations |
|---|---|---|
| Miles per hour | Millifarads | Percent |
| 20 | .4 | Approximately 15 |
| 30 | .3 | Approximately 22 |
| 40 | .2 | Approximately 30 |

Increasing the capacity of condenser 26 makes fewer positive-transfer arcs available and thus lowers the tendency to transfer to the positive, because increase of capacity lowers the frequency of primary oscillation and the amplitude of primary voltage and increases the high-frequency by-pass ability of the condenser. However, although fewer positive-transfer arcs are obtainable (only during engine acceleration), the effectiveness of each positive-transfer arc is greater than when a smaller capacity condenser is used, because the condenser discharge current is greater. The .4 m. f. condenser is sufficient for 12-volt service for buses driven at an average speed of 20 M. P. H. since the 15% of compensating arcs which are available are more effective than the arcs which are available when using a .2 m. f. condenser.

Decreasing the capacity of condenser 26 increases the frequency of primary oscillation and the amplitude of primary voltage and decreases the high frequency by-pass ability of condenser 26. Hence more positive transfer arcs are available. But, since the effectiveness of each arc is less because the condenser discharge current is less, more arcs are required than in the case where a .4 mf condenser 26 is used. Therefore, in case of high speed bus service as well as in pleasure car service in which a condenser 26 of .2 mf capacity is used, positive transfer arcs will be available during 30% of the total cycles of timer operation, at 40 M. P. H. average speed of driving. But this percentage has not been found to be excessive since the effectiveness of each arc is not so great as in the case where a large capacity condenser 26 is used.

EXAMPLES OF THE APPLICATION OF THE PRINCIPLES DISCLOSED IN THE SPECIFICATION TO CORRECTION OF CONTACT TRANSFER

I have found by experiments, when the engine speed varies over a wide range corresponding to a vehicle speed range of 15 to at least 60 M. P. H. that, in general, there is a substantial balance between negative transfer and positive transfer when the oscilloscope shows 100% positive transfer arcs up to 30 M. P. H. and a gradual diminution in percentage to zero at about 45 M. P. H. This is typical example of conditions by which a substantial balance of contact metal transfer is effected. It will be understood that it may be necessary to vary somewhat from these conditions depending on the equipment, type of service (low or high average speed), and other circumstances.

I found by oscilloscope test that such conditions exist on certain installations, for example, on a certain 6-cylinder passenger automobile which uses a relatively low ratio ignition coil (230 primary turns, 14500 secondary turns) and which is not provided with a radio interference suppressor (corresponding to element 40 of Fig. 12). In this installation, the capacity between the secondary leads and ground was relatively low (low value of capacities 27b and 35 of Fig. 2), since the high tension lead from the coil to the distributor and the spark plug cables were located as far away from the engine and chassis as practically possible. The capacity coupling 37 between primary and secondary leads from the coil to the timer distributor unit was sufficient when these leads were about 2 inches apart. When a radio interference suppressor was added to this installation, the positive transfer arcs disappeared; hence it was necessary to resort to the expedient illustrated in Fig. 13. By bundling four of the six spark plug cables with a dead end wire 24b for a distance of about 10 inches, the required percentage of positive transfer arcs was obtained.

In ignition equipment for 8-cylinder passenger automobiles, high ratio coils (90 or 100 to 1) are used to provide sufficient sparking at high speeds. High ratio coils give lower primary induced voltage; hence, there is less tendency to produce positive transfer arcs. When such equipment is provided with a radio interference suppressor (element 40 of Fig. 12), it is necessary to provide high capacity coupling between the primary terminal 24a and all of the spark plug cables 33a. Instead of bundling the dead end wire 24b with all of the cables 33a, it is just as effective to provide a single high capacity coupling between the terminal 24a and that portion of secondary lead 27a between resistor 40 and the distributor terminal 31. A preferred form of this coupling is disclosed in the copending application of Verle E. McCarty, Serial No. 227,657, filed August 31, 1938.

The experience gained with respect to passenger automobile equipment applies to truck equipment when the truck is driven over a wide range of speeds up to 60 M. P. H. One such equipment which included a high ratio coil (200 primary turns, 18000 secondary turns) and which was designed to give high break amperes 4.7 amps peak), showed a tendency to transfer to the negative contact. It was found that the leads from the coil (mounted on the bulkhead) to the timer-distributor unit (mounted on the engine) were separated an average distance of 10 inches. A substantial balance of contact transfer was effected by running these leads through a piece of loom about 4¼ inches long placed near the timer-distributor. This expedient would be satisfactory for average normal driving conditions, but obviously would not give the required correction if the truck were driven continuously at high speeds or at low speeds. One peculiarity of this truck engine ignition equipment was that it gave higher secondary voltage on part throttle than on wide-open throttle. Usually the reverse is true. This peculiarity was due to the leanness of the mixture ratio on part throttle. The length of the loom in which coil leads were encased might have been different if the equipment had been such as to show less secondary voltage on part throttle.

A certain passenger bus equipment which included a 12-volt low ratio coil displayed transfer to the positive. The oscilloscope show 100% positive transfer arcs throughout the entire speed range. The engine was mounted under the floor and the coil upon the floor. The two coil leads ran from the coil close together through a hole in the floor to the timer-distributor unit underneath. Substantial balance of metal transfer was effected by mounting the coil under the floor upon a metal cross member, which greatly increased capacity couplings 27a and 23b, particularly the latter. The coil leads were run, respectively, from the coil to the timer-distributor unit and were spaced apart an average distance of about one foot, thus decreasing the capacity coupling 37. The condenser lead length was reduced from 4½" to 2½", thus increasing the high frequency by-passing ability of the condenser 26, the capacity of which (.3 mf) was not altered.

An explanation of material transfer to the negative electrode differing from that of Holm and Thomson has been presented by W. Betteridge and J. A. Laird (The Wear of Electrical Contact Points, pages 625–632 of "The Journal of the Institution of Electrical Engineers" published by E. and F. N. Spon, Ltd., 57 Haymarket, London, S. W. 1.)

They state:

"The reason for the transference at break can be seen if we consider the process of formation and collapse of the molten bridge. As the contacts are separated the final area of contact becomes heated because of the rise of resistance, and the Thomson effect will cause the anode to become hotter than the cathode. Hence when the heating becomes sufficiently intense it is the anode which will melt and supply the metal to form the bridge. As the contacts separate further the bridge will eventually collapse, leaving some material on each contact, so that some of the metal of the anode which formed the bridge is transferred to the cathode."

Whichever may be the correct explanation, it remains that there is a transfer of material to the negative contact at the time of break of the timer contacts; and I propose to compensate for such transfer by subjecting the contacts to positive transfer arcs caused by subjecting the contacts to a voltage which is the sum of primary induced voltage and a transient voltage derived from high frequency oscillation which occurs when the secondary discharges.

This application is a continuation in part of my copending application, Serial No. 227,775, filed August 31, 1938.

While the embodiment of the present invention as herein disclosed constitutes a preferred form, it is to be understood that other forms might be adopted, all coming within the scope of the claims which follow.

What is claimed is as follows:

1. The method of obtaining substantially flat contact operation in an ignition system for internal combustion engines by balancing negative-transfer with positive-transfer which consists in maintaining the primary induced voltage below a value sufficient to start an arc between the timer contacts after the initial separation thereof during which transfer of contact metal to the negative contact takes place, and in augmenting the primary induced voltage at the time of secondary discharge by a transient voltage derived from a high frequency oscillation accompanying secondary discharge, the value of the transient voltage being controlled so that the total voltage impressed upon the contacts will be sufficient to produce positive-transfer arcs in such numbers and of such intensity that compensation for transfer of metal to the negative contact will be effected.

2. The method of obtaining substantially flat contact operation in an ignition system for internal combustion engines by balancing negative-transfer with positive-transfer which consists in so preconditioning the system that primary induced voltage alone will be insufficient to start an arc between the timer contacts after the initial opening thereof during which transfer of contact metal to the negative contact takes place, and in augmenting the primary induced voltage at the time of secondary discharge by a transient voltage derived from a high frequency oscillation accompanying secondary discharge, the system being so preconditioned that the value of the transient voltage is controlled so that the total voltage impressed upon the contacts will be sufficient to produce positive-transfer arcs in such numbers and of such intensity that compensation for transfer of metal to the negative contact will be effected.

3. The method of obtaining substantially flat contact operation in an ignition system for internal combustion engines by balancing negative-transfer with positive-transfer which consists in preconditioning the system by the use of a suitable timer cam to obtain such gap distance between timer contacts at the time of secondary discharge that primary induced voltage alone will be insufficient to start an arc between the contacts at the time of secondary discharge, the gap distance being dependent upon the rate of contact separation, and in augmenting the primary induced voltage at the time of secondary discharge by a transient voltage derived from high frequency oscillation accompanying secondary discharge, the system being so preconditioned that the value of the transient voltage is controlled so that the total voltage impressed upon the contacts will be sufficient to produce positive-transfer arcs in such numbers and of such intensity that compensation for transfer of metal to the negative contact will be effected.

4. The method of obtaining substantially flat contact operation in an ignition system for internal combustion engines by balancing negative-transfer with positive-transfer which consists in preconditioning the system by a proper control of the rate of secondary build-up, said rate being made slower by increase of the timer condenser capacity, in order to obtain such gap distance between timer contacts at the time of secondary discharge that primary induced voltage alone will be insufficient to start an arc between the contacts at the time of secondary discharge, the gap distance being dependent upon the rate of secondary build-up, and in augmenting the primary induced voltage at the time of secondary discharge by a transient voltage derived from a high frequency oscillation accompanying secondary discharge, the system being so preconditioned that the value of the transient voltage is controlled so that the total voltage impressed upon the contacts will be sufficient to produce positive-transfer arcs in such numbers and of such intensity that compensation for transfer of metal to the negative contact will be effected.

5. The method of obtaining substantially flat contact operation in an ignition system for internal combustion engines by balancing negative-transfer with positive-transfer which consists in preconditioning the system by a proper control of the rate of secondary build-up, said rate being made slower by decrease of primary supply voltage, in order to obtain such gap distance between timer contacts at the time of secondary discharge that primary induced voltage alone will be insufficient to start an arc between the contacts at the time of secondary discharge, the gap distance being dependent upon the rate of secondary build-up, and in augmenting the primary induced voltage at the time of secondary discharge by a transient voltage derived from a high frequency oscillation accompanying secondary discharge, the system being so preconditioned that the value of the transient voltage is controlled so that the total voltage impressed upon the contacts will be sufficient to produce positive-transfer arcs in such numbers and of such intensity that compensation for transfer of metal to the negative contact will be effected.

6. The method of obtaining substantially flat contact operation in an ignition system for internal combustion engines by balancing negative-transfer with positive-transfer which consists in maintaining the primary induced voltage below a value sufficient to start an arc between the timer contacts after the initial separation thereof during which transfer of contact metal to the negative contact takes place, the system being preconditioning by the use of a timer condenser having such capacity as to provide a limit for primary induced voltage and in augmenting the primary induced voltage at the time of secondary discharge by a transient voltage derived from a high frequency oscillation accompanying secondary discharge, the system being so preconditioned that the value of the transient voltage is controlled so that the total voltage impressed upon the contacts will be sufficient to produce positive-transfer arcs in such numbers and of such intensity that compensation for transfer of metal to the negative contact will be effected.

7. The method of obtaining substantially flat contact operation in an internal combustion engine ignition system which consists in maintaining the primary induced voltage below that required to start an arc across the separating timer contacts up to and including the occurrence of secondary discharge, and in effecting, through the medium of a capacity coupling between the secondary circuit and the ignition timer, the augmentation of the primary induced voltage by a transient voltage derived from a high frequency oscillation occurring during secondary discharge, in order to provide positive-transfer arcs at the timer contacts in sufficient numbers and of sufficient intensity to effect a substantial balance between negative and positive transfer.

8. The method according to claim 7, in which the value of a transient voltage is predetermined by preconditioning the system, the value of transient voltage being increased or decreased by decreasing or increasing the distance between the coil-to-timer lead and the coil-to-distributor lead.

9. The method according to claim 7, in which the value of transient voltage is predetermined by preconditioning the system, the value of transient voltage being increased or decreased by increasing or decreasing the distance between ground and the coil-to-timer lead and by increasing or decreasing the distance between ground and the coil-to-distributor lead.

10. The method according to claim 7, in which the value of transient voltage is predetermined by preconditioning the system, the value of the transient voltage being increased or decreased by decreasing or increasing the ability of the timer condenser to by-pass the high-frequency oscillation occurring during secondary discharge.

11. The method according to claim 7, in which the value of transient voltage is predetermined by preconditioning the system, the value of the transient voltage being increased or decreased by decreasing or increasing the capacity of the timer condenser in order to decrease or increase the ability of the timer condenser to by-pass the high frequency oscillation occurring during secondary discharge.

12. The method according to claim 7, in which the value of transient voltage is predetermined by preconditioning the system, the value of the transient voltage being increased or decreased by increasing or decreasing the length of the wire connecting the timer condenser with the timer insulated terminal in order to decrease or increase the ability of the timer condenser to by-pass the high-frequency oscillation occurring during secondary discharge.

13. The method according to claim 7, in which the value of the total voltage (primary induced voltage plus transient voltage) impressed upon the timer contacts at the time of secondary discharge is predetermined by the use of timer condenser having such capacity as to effect a control on rate of secondary build up (which controls timer gap distance at the time of secondary discharge) and to provide a limitation on primary induced voltage, and also to provide a limitation on transient voltage by virtue of its high-frequency by-pass ability.

14. The method of obtaining substantially flat contact operation in the ignition system of an internal-combustion-engine-propelled vehicle driven ordinarily over a relatively wide range of speeds which consists in maintaining the primary induced voltage below that required to start an arc across the separating timer contacts up to and including the time of secondary discharge, and in effecting, through the medium of a capacity coupling between the secondary circuit and the ignition timer, the augmentation of the primary induced voltage by a transient voltage derived from a high frequency oscillation occurring during secondary discharge, in order to provide positive-transfer arcs at the timer contacts, the capacity coupling being preconditioned so that, at certain lower speeds, a positive-transfer arc will be provided during every contact separation and, as the speed increases the percentage of arcs (compared with total contact separations) will decrease due to decrease in spark plug voltage and increase in timer contact gap distance resulting from higher speed operation, the number of arcs obtained during a period of driving which is representative of the average of driving conditions being such as to produce positive-transfer which will substantially balance negative-transfer during that period.

15. The method of obtaining substantially flat contact operation in the ignition system of an internal-combustion-engine-propelled vehicle driven ordinarily over a relatively limited range of low speeds which consists in maintaining the primary induced volage below that required to start an arc across the separating timer contacts up to and including the time of secondary discharge, and in effecting, through the medium of a capacity coupling between the secondary circuit and the ignition timer, the augmentation of the primary induced voltage by a transient voltage derived from a high frequency oscillation occurring during secondary discharge, in order to provide positive-transfer arcs at the timer contacts, the capacity coupling being preconditioned so that, only during engine acceleration when fuel compression pressure is higher, a positive-transfer arc will be provided during every contact separation, but will be eliminated during engine deceleration and idling due to the lowering of spark plug voltage resulting from the lowering of fuel compression pressure, the number of arcs obtained during a period of driving which is representative of the average of driving conditions being such as to produce positive-transfer which will substantially balance negative-transfer during that period.

16. The method of obtaining substantially flat contact operation in a six-volt ignition system for an internal-combustion-engine-propelled vehicle operating over a relatively wide speed range, the system displaying a tendency to transfer to the negative contact, which includes the step of increasing the transient voltage derived from the high frequency oscillation occurring during secondary discharge which is added to the primary induced voltage at the time of secondary discharge in order to produce positive-transfer arcs across the timer contacts, said step being carried out by decreasing the distance between the high and low tension leads from the ignition coil, by increasing the distance between said leads and ground, and by decreasing the high-frequency by-pass ability of the timer-condenser which is accomplished by a decrease of condenser capacity and by an increase in the length of the lead connecting the condenser with the insulated timer contact, the increase of the transient voltage being brought about to such degree that the positive-transfer arcs occur in sufficient numbers and with sufficient intensity to effect a substantial balance between negative-transfer and positive-transfer during a period of vehicle operation which is representative of the average driving conditions.

17. The method of obtaining substantially flat contact operation in a twelve-volt ignition system for an internal-combustion-engine-propelled vehicle operating over a relatively narrow speed range, the system displaying a tendency to transfer to the positive contact, which includes the step of decreasing the primary induced voltage by increasing the capacity of the timer condenser so as to decrease also the rate of build-up of the secondary and thus increase timer-contact gap distance at the time of secondary discharge, and the step of decreasing the transient voltage derived from the high frequency oscillation occurring during secondary discharge to a point when the sum of primary induced voltage and transient voltage is sufficient, during operation over the vehicle within the narrow speed range, to cause a positive-transfer arc to occur only during engine acceleration, said last step being accomplished by placing further apart the low and high tension leads from the ignition coil to the timer and distributor, by placing these leads closer to ground, by increasing the high frequency by-pass ability of the timer condenser which is accomplished by decreasing the condenser-to-timer lead length, also by increasing the condenser capacity, the condenser capacity being greater when the driving range is a lower speed range and less when the driving range is a higher speed range.

18. The method of obtaining substantially flat contact operation in an internal combustion engine ignition system which consists in maintaining the primary induced voltage below that required to start an arc across the separating timer contacts up to and including the occurrence of secondary discharge, and in effecting, through the medium of a capacity coupling between the secondary circuit and the ignition timer, the augmentation of the primary induced voltage by a transient voltage derived from a high frequency oscillation occurring during secondary discharge in order to provide positive-transfer arcs at the timer contacts, said capacity coupling being effected by a wire connected with the positive timer contact and capacity-coupled with a plurality of the spark plug cables, the number of the cables with which said wire is capacity-coupled being such as to cause the production of positive-transfer arcs sufficient to substantially balance negative transfer over the period of use representing the average.

19. Ignition apparatus for internal combustion engines comprising a primary circuit including the ignition coil primary winding and the ignition timer and a timer condenser and a secondary circuit including the ignition coil secondary winding and the ignition distributor and providing such capacity coupling between the secondary lead for the ignition coil and the primary lead from the ignition coil to the timer and such high frequency by-pass through the timer-condenser that the transient voltage derived from the high frequency oscillation occuring during secondary discharge will add sufficient voltage to the primary induced voltage that a positive-transfer arc will be started between the timer contacts each time the secondary discharges at certain speeds, the number of arcs diminishing as the speed increases due to decreasing spark plug voltages and increasing timer contact gap at the instant of secondary discharge.

20. Ignition apparatus for internal combustion engines comprising a primary circuit including the ignition coil primary winding and the ignition timer and a timer condenser and a secondary circuit including the ignition coil secondary winding and the ignition distributor and providing such capacity coupling between the secondary lead for the ignition coil and the primary lead from the ignition coil to the timer and such high frequency by-pass through the timer-condenser that the transient voltage derived from the high frequency oscillation occuring during secondary discharge will add sufficient voltage to the primary induced voltage that a positive-transfer arc will be started between the timer contacts each time the secondary discharges only during acceleration of the engine when the fuel compression pressure is relatively high the number of arcs diminishing as engine compression decreases, so that there will be no arcs during deceleration and idling.

HERMAN L. HARTZELL.